United States Patent [19]
Corkins et al.

[11] Patent Number: 5,476,305
[45] Date of Patent: Dec. 19, 1995

[54] INTEGRATED CHILD SEAT WITH SAFETY LOCKING MECHANISM

[75] Inventors: M. Jeffry Corkins, Milford; Matthew E. Dukatz, Bloomfield Hills; Jeffrey T. Lambert, Commerce Township; Jay P. McCarthy, Livonia; Stephen A. Sharples, Northville, all of Mich.

[73] Assignees: Atoma International, Inc., Newmarket, Canada; Chrysler Corporation, Auburn Hills, Mich.

[21] Appl. No.: 352,859

[22] Filed: Dec. 2, 1994

[51] Int. Cl.$^6$ ............................................. A47C 15/00
[52] U.S. Cl. ............................................. 297/238; 296/65.1
[58] Field of Search ................................. 297/238, 234, 297/378.11, 378.12, 452.18; 296/65.1

[56] References Cited

U.S. PATENT DOCUMENTS

| | | | |
|---|---|---|---|
| 4,572,569 | 2/1986 | Habmann | 296/65.1 |
| 4,627,656 | 12/1986 | Gokimoto et al. | |
| 4,657,297 | 4/1987 | Ishibashi | 296/65.1 X |
| 4,684,175 | 8/1987 | Trutter | 296/65.1 X |
| 4,880,264 | 11/1989 | Yamazaki et al. | 296/65.1 X |
| 4,904,003 | 2/1990 | Yamazaki et al. | 296/65.1 X |
| 4,925,227 | 5/1990 | Batemann | 296/65.1 |
| 5,224,756 | 7/1993 | Dukatz et al. | |
| 5,248,178 | 9/1993 | Brambilla | 296/65.1 |
| 5,280,995 | 1/1994 | Elton | 297/238 |
| 5,290,090 | 3/1994 | Bell et al. | 297/238 |
| 5,380,060 | 1/1995 | Sponsler et al. | 297/238 |
| 5,383,707 | 1/1995 | Osenkowski et al. | 297/238 |

*Primary Examiner*—Peter M. Cuomo
*Assistant Examiner*—Rodney B. White
*Attorney, Agent, or Firm*—Cushman Darby & Cushman

[57] ABSTRACT

A seat for a motor vehicle providing at least two modes of operation including an adult seat mode and a child seat mode. The seat has a rigid frame assembly having a seat cushion carried thereon, a rigid seat back frame assembly having a seat back cushion assembly carried thereon, the seat back frame assembly being mounted with respect to the rigid frame assembly for movement between an operative, generally vertical orientation and a second inoperative orientation whereby the seat back frame assembly is disposed in generally horizontal orientation in generally overlying relation with the seat cushion. The seat back cushion assembly includes a movable cushion assembly mounted on the seat back frame assembly and being movable between (1) an adult mode position wherein the movable cushion assembly provides an adult seat back and (2) a child mode position wherein the movable cushion assembly provides a child's seat disposed in overlying relation with the seat cushion. The seat further includes a locking mechanism for locking the seat back frame assembly in its operative position upon deployment of the movable cushion assembly to its child mode position.

11 Claims, 7 Drawing Sheets

INTEGRATED CHILD SEAT WITH SAFETY LOCKING MECHANISM

BACKGROUND OF THE INVENTION

This invention relates to seats for automotive vehicles having integrated movable components capable of being moved between an adult mode position and a child mode position, and, more particularly, to improvements relating to the deployment of the movable components in a child mode position.

Conventional vehicle seats provide a cushion seat assembly including a seat frame for securement to the vehicle interior and a seat back frame mounted with respect to the seat cushion frame. The seat cushion frame and the seat back frame include cushion assemblies. In many instances, particularly where the seat constitutes a rear seat in the vehicle, the seat back frame is made to be movable with respect to the seat cushion frame from a first, generally vertical orientation defining an operative position for supporting the back of one or more vehicle occupant to a second, inoperative position whereby the entire seat back frame, or a portion thereof, is collapsed forwardly so as to rest upon the cushion of the seat cushion frame. The seat back frame is typically moved from its operative position to its inoperative position by releasing a latch mechanism. In the inoperative position, the seat back frame provides additional cargo space within the interior of the vehicle and/or access to the trunk of the vehicle.

Integrated child seats have been provided within the seat back of conventional vehicle seats, see for example U.S. Pat. No. 5,224,756. When an integrated child seat is embodied in a seat back of the type which is capable of being released and collapsed forwardly, there is presented a particular problem in that if for some reason the latch mechanism is released while the integrated child seat is occupied, the forward movement of the seat back with the child therein could present a serious hazard to the child. While such an event would not be expected to occur, the unexpected often occurs when there are children present in the vehicle, other than the one in the child seat.

SUMMARY OF THE INVENTION

An object of the present invention is to provide a vehicle seat including a seat back frame movable from an operative support position to an inoperative, forwardly collapsed position and having integrated components movable from an adult mode position to a child mode position such that upon deployment of the child mode position, the hazard noted above will be effectively eliminated.

In accordance with the principles of the present invention, this objective is obtained by providing a seat for a motor vehicle providing at least two modes of operation including an adult seat mode and a child seat mode. The seat has a rigid frame assembly constructed and arranged for securement within the motor vehicle having a seat cushion carried thereon, a rigid seat back frame assembly having a seat back cushion assembly carried thereon, the seat back frame assembly being mounted with respect to the rigid frame assembly for movement between an operative, generally vertical orientation defining a support position so as to support backs of vehicle occupants and a second inoperative orientation whereby the seat back frame assembly is disposed in generally horizontal orientation in generally overlying relation with the seat cushion. The seat back cushion assembly includes a movable cushion assembly mounted on the seat back frame assembly and is constructed and arranged to be movable, when the seat back frame assembly is in its operative position, between (1) an adult mode position wherein the movable cushion assembly provides an adult seat back for engaging the back of an adult sitting on the seat cushion and (2) a child mode position wherein the movable cushion assembly provides a child's seat disposed in overlying relation with the seat cushion. The seat further includes a locking mechanism constructed and arranged with respect to the movable cushion assembly and the seat back frame assembly so as to be movable between (1) an unlocked position when the movable cushion assembly is disposed in the adult mode position and (2) a locked position when the movable cushion is moved to the child mode position so as to prevent the seat back frame assembly from moving to its inoperative position.

Another object of the present invention is the provision of a vehicle seat of the type described which is simple in construction, effective in operation and economical to manufacture and maintain. These and other objectives if the present invention will become apparent during the course of the following detailed description and appended claims.

DETAILED DESCRIPTION OF THE INVENTION

Figure 1:
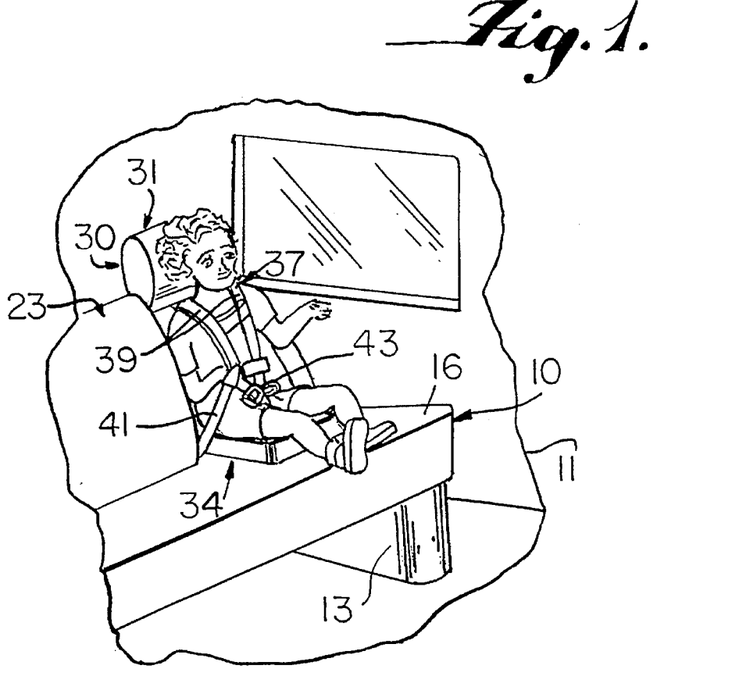
FIG. 1 is a fragmentary perspective view of a two-mode seat embodying the principles of the present invention showing the seat installed in a motor vehicle and disposed in its child mode position with a child therein.
Figure 2:
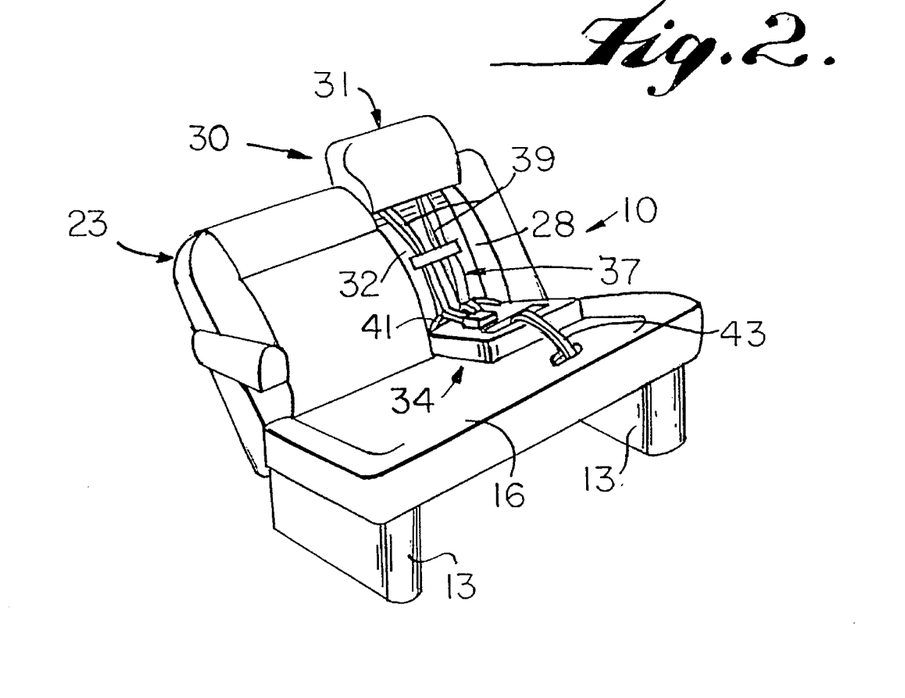
FIG. 2 is a view of the seat similar to FIG. 1, shown without the child therein.

Referring to the drawings, a vehicle seat, generally indicated at 10, is shown embodying the principles of the present invention. The vehicle seat 10 is adapted to be mounted to the interior of a vehicle 11 at risers 13. The vehicle seat 10 shown in FIGS. 1 and 2 is a bench seat of the type installed in the rear of the vehicle. As shown, the left operative position of the bench seat 10 is provided with a child's seat module, generally indicated at 30. The child's seat module 30 is suitable to be fixed to the seat back frame of any vehicle seat, including single, tandem, or three-occupant bench seats. In the illustrated embodiment of FIGS. 1 and 2, the child's seat module 30 also provides a movable cushion assembly 34 and a movable child's head rest 31 for supporting the head of a child disposed in the child's seat.

Figure 3:
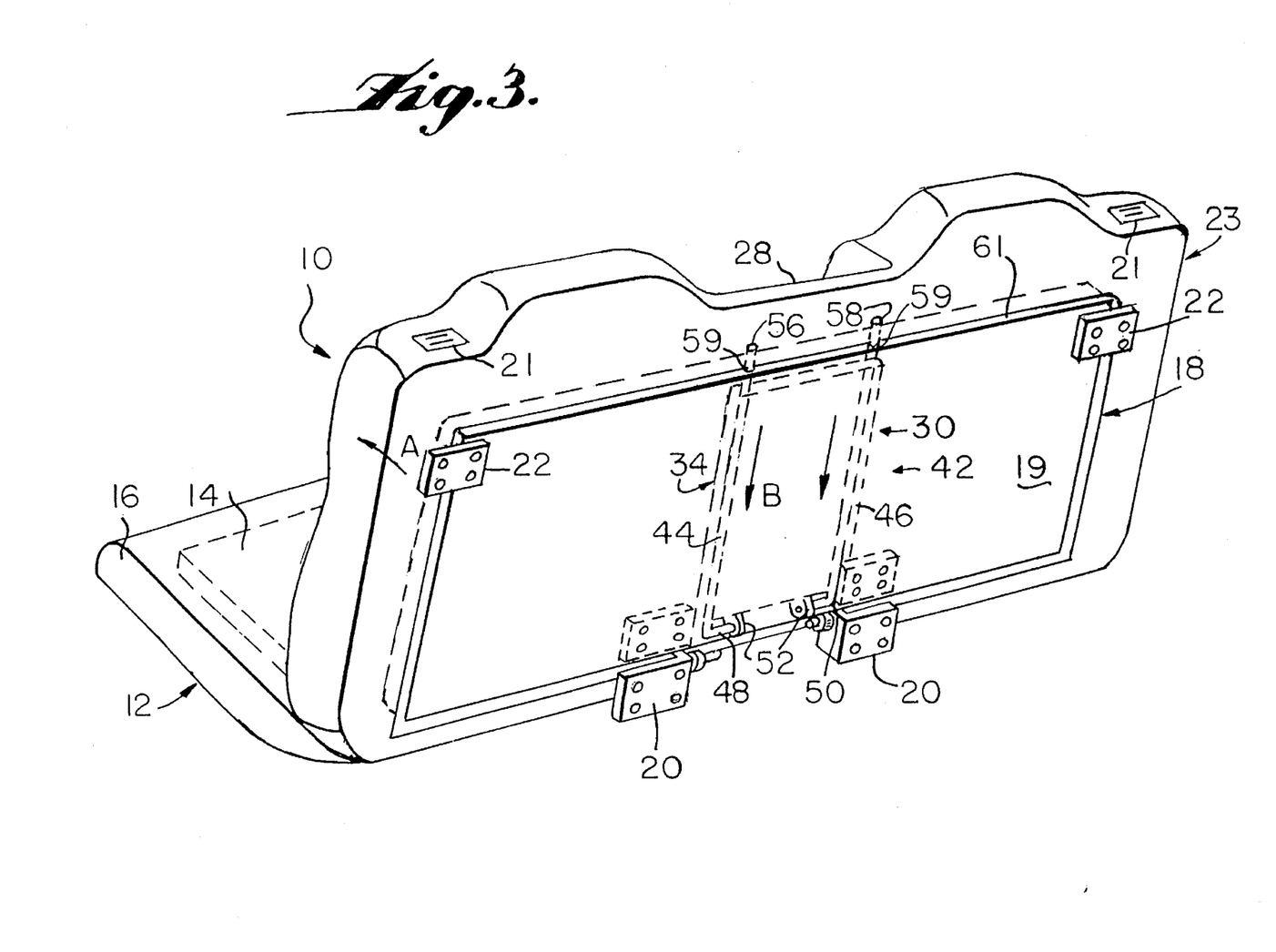
FIG. 3. is a schematic perspective view of an end portion of a vehicle seat having a forwardly folding portion and including an integrated child seat module shown in an adult mode position, and a locking mechanism, shown in an unlocked position.

Referring to FIG. 3, the vehicle seat 10 is of the three-occupant type for use in a hatch-back vehicle or a vehicle with a trunk. The vehicle seat 10 includes a rigid frame assembly, generally indicated at 12, defining a seat cushion frame 14 of conventional configuration having a generally rectangular peripheral structure on which is supported a covered seat cushion 16 having a width sufficient to accommodate two adult seat occupants sitting thereon in a side-by-side relation. The rigid frame assembly 12 is constructed and arranged to be fixed to the interior of the vehicle.

The vehicle seat 10 also includes a rigid seat back frame assembly, generally indicated at 18, which is also of conventional construction having a generally rectangular peripheral structure. The seat back frame assembly 18 includes a movable portion 19 and hinges 20 disposed at the lower end thereof in a spaced relation for pivotally coupling the movable portion 19 to the rigid frame assembly 12. Thus, movable portion 19 of the seat back frame assembly 18 is movable between an operable, generally vertical orientation defining a support position for supporting the back of one or more vehicle occupant (FIG. 3) and a second, inoperative orientation whereby the movable portion 19 of the seat back frame 18 is pivoted forwardly upon manual movement of actuators 21 to release the movable portion 19 from inertial latches 22. Thus, the movable portion 19 may be collapsed forwardly, in the direction of arrow A (FIG. 3), via hinges 20 so as to be disposed in a generally horizontal orientation in an overlying relation with seat cushion 16 in an inoperative position. If the vehicle is of the type including a trunk or is a hatch-back type vehicle, when the movable portion 19 of the seat back frame assembly 18 is in the collapsed position, the trunk or area behind the seat can be accessed from the occupant compartment, defining additional space for cargo which would otherwise not be easily accommodated within a conventional truck or hatch-back storage space.

It can be appreciated that the pivotal arrangement of the seat back frame assembly 18 with respect to the rigid frame assembly 12 may be of any conventional construction. The pivot points are shown to be generally at the center of the frame assembly, but it can be appreciated that the pivot points can be disposed at various positions on the frame assembly 12.

Inertia latches 22, or similar latches, hold the movable portion 19 of seat back frame assembly 18 in its operative position and must be disengaged via the actuator 21, operatively associated with each of the latches 22, prior to moving the movable portion 19 to its inoperative position. Actuator 21 shown schematically in FIGS. 3 and 4, may be of any conventional construction whereby manual actuation thereof releases latches 22 from a latched position, permitting portion 19 of the seat back frame assembly 18 to move to its operative position.

Figure 5:
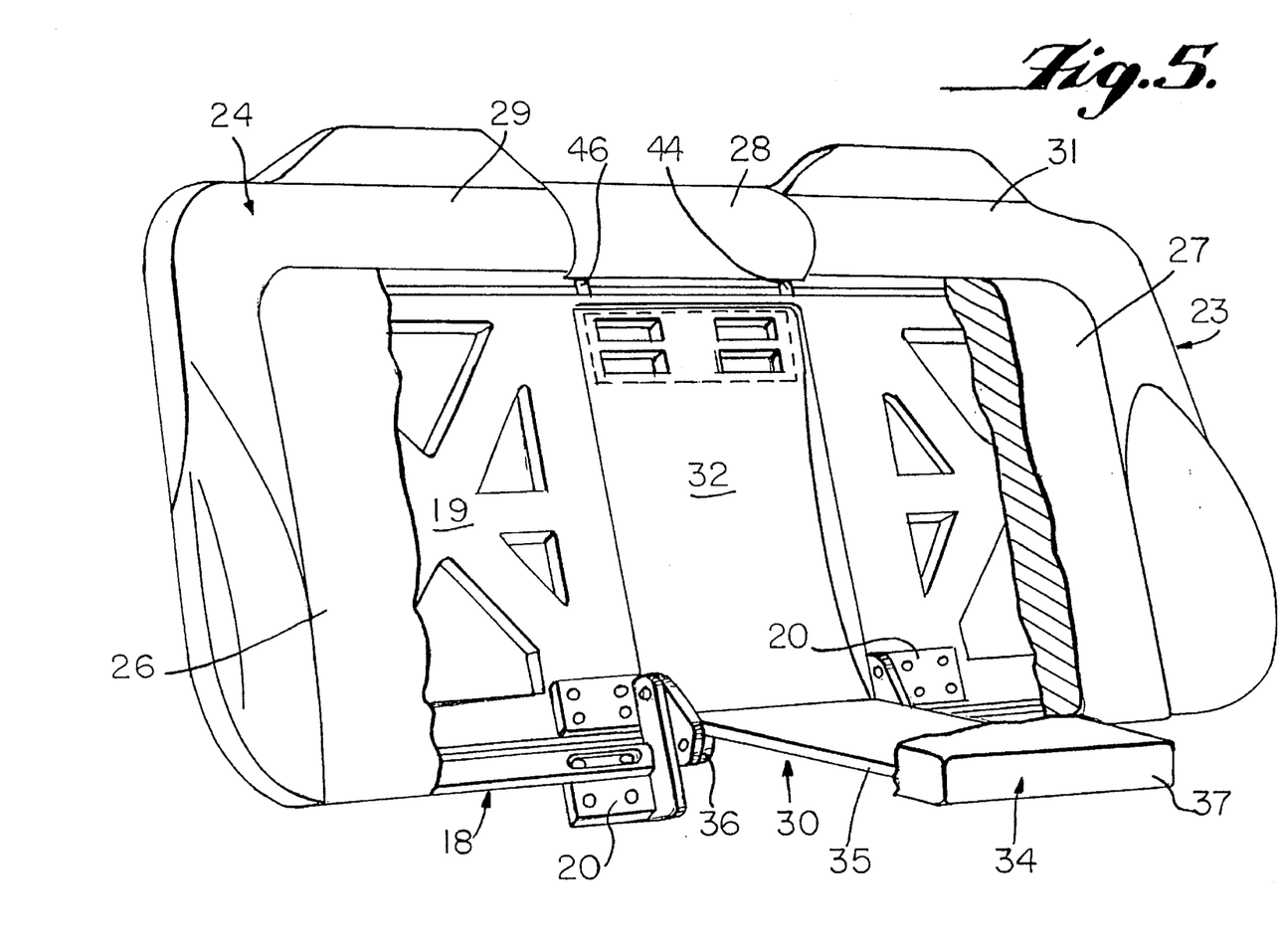
FIG. 5 is a perspective view of a front portion of the seat back frame assembly of FIG. 4, shown with the seat back cushions removed from the movable portion thereof for clarity of illustration.

Mounted forwardly of the seat back frame assembly 18 is a seat back cushion assembly, generally indicated at 23. With reference to FIG. 5, the seat back cushion assembly 23 includes a fixed cushion assembly 24 mounted on the frame assembly 18, having an upper portion joining a pair of side bolster portions so as to form a fixed, generally inverted U-shape structure. The seat back cushion assembly 23 also includes side cushions 26 and 27 mounted on the movable portion 19 of the frame assembly 18. Only a portion of cushions 26 and 27 are shown in FIG. 5 for clarity of illustration. Side cushions 26 and 27 together with fixed cushion assembly 24 define a pair of adult seat back cushioned areas 29 and 31 spaced apart a distance sufficient to fit a child therebetween. Thus, a space 28 is provided between cushioned area 29 and 31 and forwardly of the seat back frame assembly 18 sufficient to receive a child therein and within which to mount a child seat module, generally indicated at 30, which is also a part of the seat back cushion assembly 23.

The child seat module 30 is of the type described in U.S. Pat. No. 5,224,756, or of commonly owned U.S. application Ser. No. 07/882,610, the disclosures of which are incorporated hereinto by this reference. The child seat module 30 includes a rigid structure, preferably of molded plastic, in the form of a back panel 32 which is coupled to the movable portion 19 of the seat back frame assembly 18 by suitable fasteners and in the broadest aspect of the invention, may be regarded as part of the seat back frame assembly 18. Module 30 also includes a movable cushion assembly 34 including a frame member or frame 35 having hinges 36 which are pivotally coupled to seat back frame assembly 18 at hinge 20 by suitable fasteners. The cushion assembly 34 is suitably covered with a cushion 37, a portion of which is shown in FIGS. 3 and 5, providing a seating surface for a child occupant. The cushion assembly 34 is movable between (1) an adult mode position where the cushion assembly 34 is disposed within space 28 between the side cushions 26 and 27 to provide a cushioned surface for engaging the back of an adult seat occupant sitting on seat cushion 16 and (2) a child mode position wherein the cushion assembly 34 extends from space 28. In the child mode position, the cushion assembly 34 extends from the bottom of space 28 in an overlying relation with seat cushion 16 so as to provide a child's seat. Although not shown in FIGS. 3–5, a movable head rest 31 (FIG. 1) may be provided which is movable to extend above the seat back frame assembly 18 to support the head of a child occupying the child seat. In the adult mode position, the cushion assembly 34 is constructed and arranged to move with the movable portion 19 when the movable portion 19 is collapsed forwardly to its inoperative position.

As shown in FIGS. 1 and 2, the child's seat module 30 includes a child's seat belt assembly, generally indicated at 37, including the conventional shoulder belts 39, thigh belts 41 and crotch belt 43, as described in U.S. Pat. No. 5,224,756.

When the cushion assembly 34 is disposed in the child seat mode, it is imperative for the safety of a child sitting within module 30 that the movable portion 19 of the seat back frame assembly 18 be prevented from being moved from its operative position to its inoperative, collapsed position. Thus, although the movable portion 19 of the seat back frame assembly 18 is secured by latches 22 in its operative position, inadvertent release of the actuators 21 and thus release of latches 22 or, an abrupt braking of the vehicle, may permit the movable portion 19 to move to its inoperative, collapsed position and thus cause injury to the child occupying the child seat.

Figure 4:
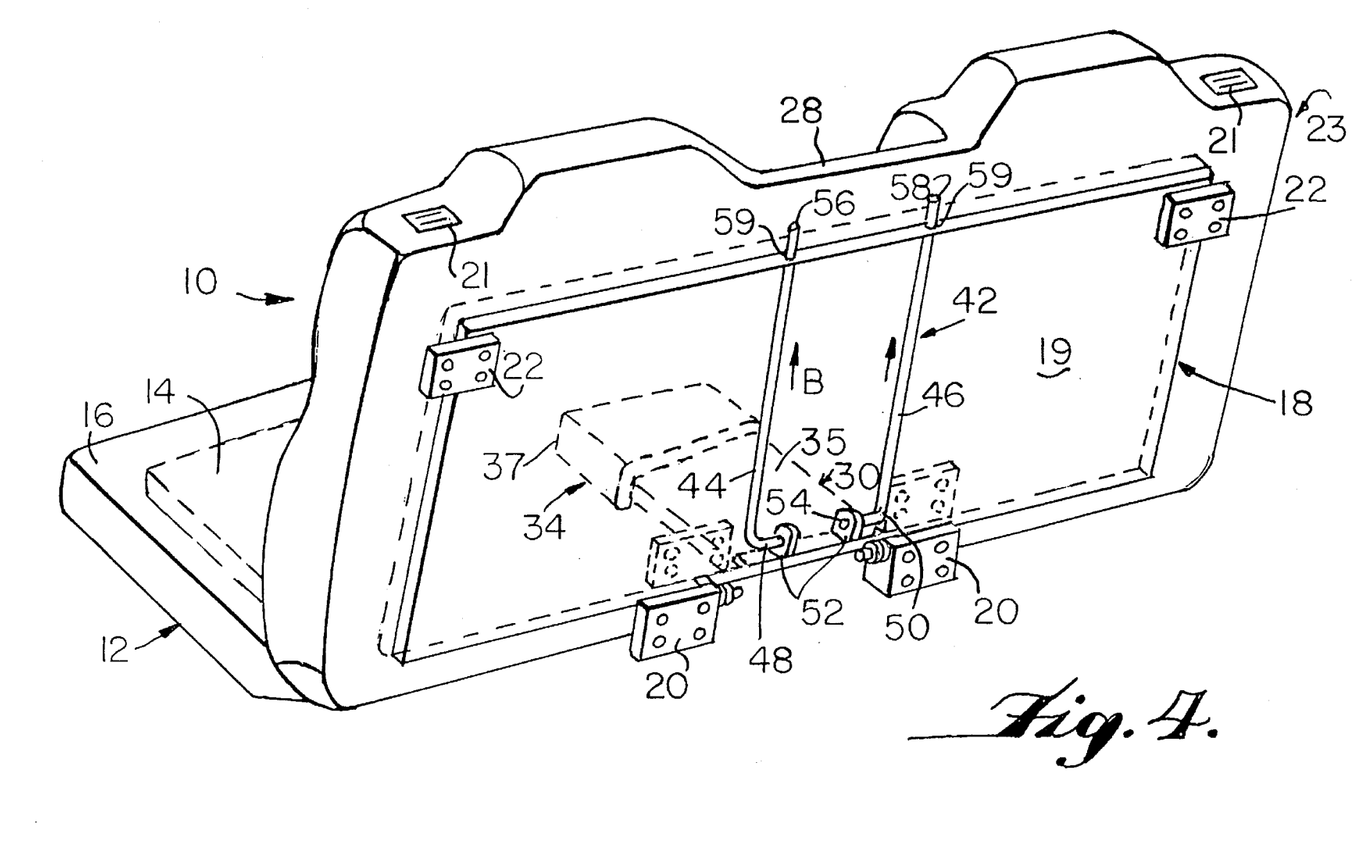
FIG. 4 is a schematic view similar to FIG. 3 showing the integrated child seat module in a child mode position, and showing the locking mechanism in its locked position.

With reference to FIGS. 3 and 4, a locking mechanism, generally indicated at 42 is provided with the seat back frame assembly 18 which cooperates with the cushion assembly 34 of module 30 so as to lock the movable portion 19 of the seat back frame assembly 18 in its operative position, upon deployment of the cushion assembly 34 to its child seat mode.

The locking mechanism 42 includes first and second latch actuation rod members or rods 44 and 46, respective ends 48 and 50 thereof being coupled to hinges 52 of the cushion frame 35 at bores 54. Opposing ends 56 and 58 of rods 44 and 46 are each aligned with bores 59 disposed in upper portion 61 of the frame assembly 18. Thus, rods 44 and 46 extend between a lower portion of the seat back frame assembly 18 and an upper portion thereof.

The locking mechanism 42 operates as follows. When the cushion assembly 34 is disposed within space 28 in the adult mode position, rod ends 56 and 58 are disposed in an unlocked position below upper frame portion 61 (FIG. 3). Thus, release of latches 22 will permit the movable portion 19 of the seat back frame assembly 18 to move to its inoperative position with respect to seat cushion frame 14 while the remainder of the seat back is maintained in its generally vertical orientation. As a result, the cargo area within the vehicle is substantially increased. When the cushion assembly 34 is disposed in the child mode position extending from space 28, rods 44 and 46 are moved vertically upward in the direction of arrow B in FIG. 4 such that rod ends 56 and 58 extend into bores 59 of frame portion 61, thus locking the movable portion 19 of the seat back frame assembly 18 in its operative position (FIG.4), preventing movement of portion 19 with respect to the seat cushion frame 14.

Although the seat back illustrated in FIGS. 3–5 includes only one portion 19 which may be collapsed forwardly to increase the cargo space within the vehicle, it can be appreciated more than one portion thereof may be provided which is permitted to collapse forwardly.

In the illustrated embodiment of FIGS. 3–5, a portion of the seat back (i.e. fixed cushion assembly 24) remains stationary in its generally vertical orientation while the movable portion 19 may collapse forwardly. It can be appreciated however, that a full-folding seat back may be provided such that the entire vertical extent of the seat back may be pivoted with respect to the seat cushion frame 14 and moved to a collapsed, inoperative position. Alternatively, a full-folding seat back may be provided with stationary side bolster portions, or, a split folding seat back may be provided wherein adjacent portions of the seat back may be selectively collapsed forwardly to access the truck of the vehicle. However, in each of these arrangements, the vertical extent of the seat back is permitted to collapse forwardly. Thus, the seat back must be locked in its operative position upon deployment of the child seat in a different manner than set forth above. Accordingly, with reference to FIG. 6, alternative structure is shown for locking a full-folding seat back in its operative position when the child seat is employed.

In situations where the entire vertical extent of the seat back is permitted to collapse forwardly to access the vehicle trunk, the vehicle is generally provided with a package shelf structure affixed to the vehicle interior, generally above a rear portion of the seat back. In the illustrated embodiment of FIG. 6, the package shelf 184 is utilized to lock the seat back assembly in its operative position upon deployment of the child seat, as will be appreciated below.

Figure 6:
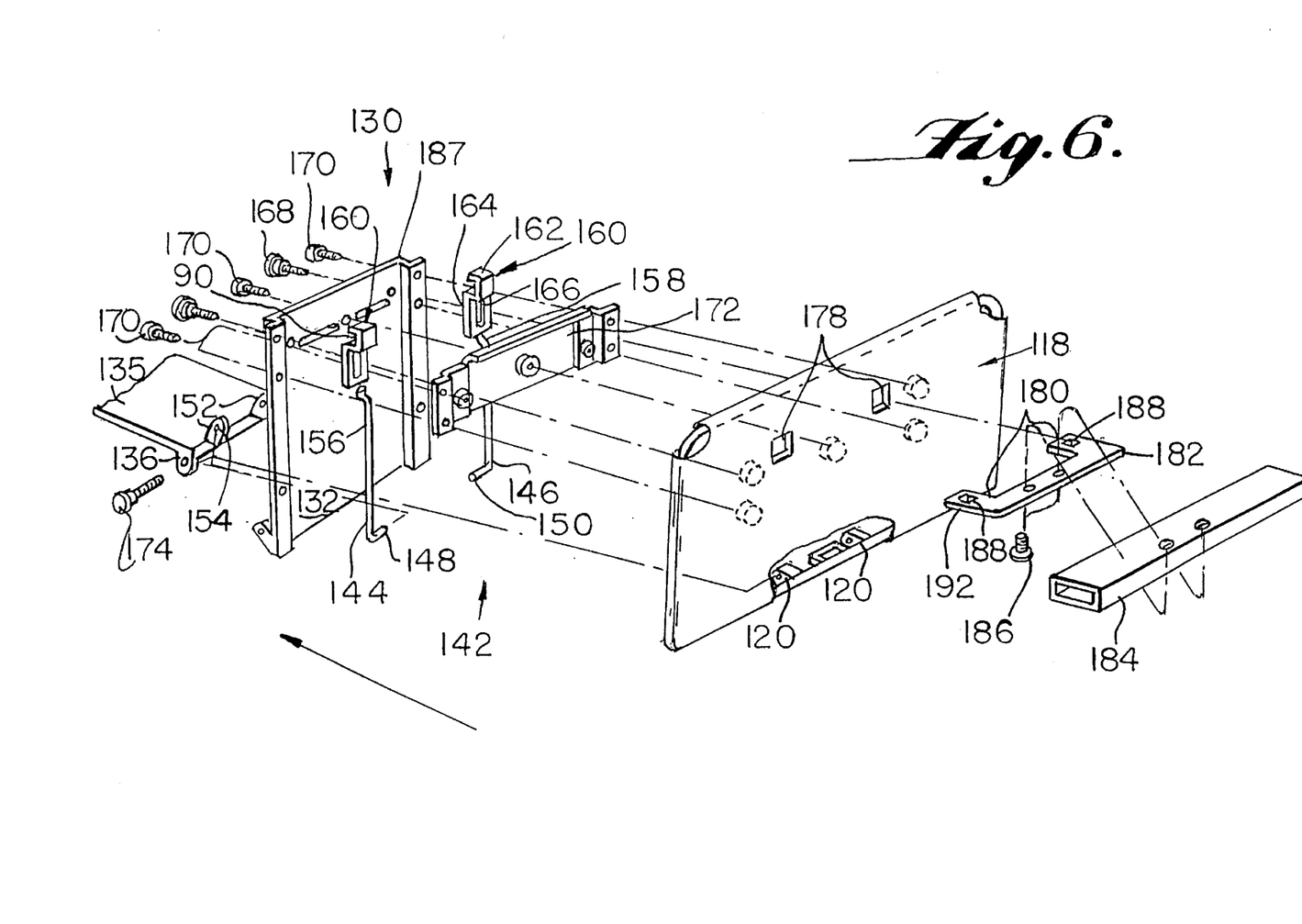
FIG. 6 is an exploded perspective view of another seat back frame assembly together with a vehicle striker plate, embodying the principles of the invention.

As in the embodiment of FIGS. 3–5, the locking mechanism 142 includes first and second latch actuation rod members or rods 144 and 146, respective ends 148 and 150 thereof being coupled to hinges 152 of the cushion frame 135 at bores 154. Opposing ends 156 and 158 of rods 144 and 146 are each coupled to a latch plate, generally indicated at 160. Thus, rods 144 and 146 extend between a lower portion of the seat back frame assembly 118 and an upper portion thereof. In the illustrated embodiment, the latch plates 160 include a U-shaped portion 162 and a plate member 164 extending downwardly from the U-shaped portion 162. The plate member 164 includes a slot 166 for receiving shoulder bolt 168, the function of which will become apparent below.

In the illustrated embodiment, child module back panel 132 is fastened to the seat back frame assembly 118 by suitable fasteners 170 together with backing plate 172 disposed between panel 132 and the seat back frame assembly 118. As shown, the latch plates 160 are fastened between back panel 132 and backing plate 172 by shoulder bolts 168. Latch plates 160 are mounted for reciprocating vertical movement as slots 166 are guidingly moved about the shoulders of shoulder bolts 168, which will become apparent below.

Frame 135 of the cushion assembly 134 is pivotally coupled to hinges 120 of seat back frame assembly 118 at hinges 136 by suitable fasteners 76.

The seat back frame assembly 118 includes slots 178 therethrough for receiving ends 180 of latch striker plate 182. Latch striker plate 182 is coupled to the package shelf 184 by suitable fasteners 186. The package shelf 184 is fixed to the interior of the vehicle. Thus, ends 180 of latch striker plate 182 extend through slots 178 above top surface 187 of back panel 132 such that latch bores 188 of striker plate 182 are aligned with latch plates 160.

The locking mechanism 142 operates in a similar manner as discussed above. When the cushion assembly 134 is disposed in its adult mode position, latch plates 160 are disposed in an unlocked position below the striker plate 182 so that release of a conventional latching mechanism (not shown) will permit the entire seat back frame assembly 118 to move to its forwardly collapsed, inoperative position with respect a seat cushion frame (not shown in FIG. 6), to increase the cargo area within the vehicle. When the cushion assembly 134 is disposed in its child mode position, rods 144 and 146 are moved vertically upward such that latch plates 160 are disposed within latch bores 188 of the striker plate. Thus, any inadvertent forward motion of the seat back frame 118 will engage surfaces 190 of latch plates 160 with surfaces 192 of striker plate 182 to lock the seat back frame assembly 118 in its operative position, preventing it to move with respect to a seat cushion frame.

When the cushion assembly 134 is returned to its adult mode position, latch plates 160 are moved downwardly, out of engagement with the striker plate 182 permitting the seat back frame assembly 118 to move, with respect to the seat cushion frame, to its inoperative position, upon release of a conventional latching mechanism (not shown).

Although U-shaped latches 160 are disclosed which mate with bores 188 of the striker plate 182, it can be appreciated that the latches 160 and the striker plate 182 may be of any convenient configuration which permits the latches to mate with the striker plate.

In certain types of vehicles employing vehicle seats wherein an entire vertical extent thereof may fold forwardly, it is not possible to provide the fixed, add-on striker plate 182 and package shelf 184 which cooperates with vertically deployed latch plates 160. For example, rear bench seat backs of the type used in vans (FIG. 1) or off-road vehicles which have an integral child seat, cannot be conveniently locked in position by a vertical locking arrangement. Accordingly, the seat back must be locked in its operative position upon deployment of the child seat in an alternate manner. Thus, referring to FIGS. 7 and 8, another embodiment of the locking mechanism of a vehicle seat 200 is shown, generally indicated at 242. As in the embodiment of FIGS. 3–5 frame 235 of the cushion assembly 234 is coupled to hinges of the seat back frame assembly 218 at pivots 280, rearwardly of seat cushion 216. Locking mechanism 242 includes a pair of short vertical rods 244 and 246 which are coupled at a distal end thereof to the cushion assembly 234 at hinges 252, such that when cushion assembly 34 is disposed within space 28 in the adult mode position, vertical rods 144 and 146 are moved downwardly, as shown by the arrows D in FIG. 7. The locking mechanism 242 also includes a pair of horizontal rod members or rods 248 and 250. Rod 248 is coupled to vertical rod 244 adjacent the distal end thereof via bracket 253. Bracket 253 is pivotally coupled to rod 244 at pin 254 and pivotally coupled to horizontal rod 248 at pin 256. Bracket 253 is pivotally affixed to the seat back frame assembly 218 at pin 257. Rod 250 is likewise coupled to rod 246 via bracket 258. Bracket 258 is coupled to vertical rod 246 at pin 260, while horizontal rod 250 is coupled to bracket 258 at pin 262. Bracket 258 is pivotally affixed to the seat back frame assembly 218 at pin 263.

Figure 7:
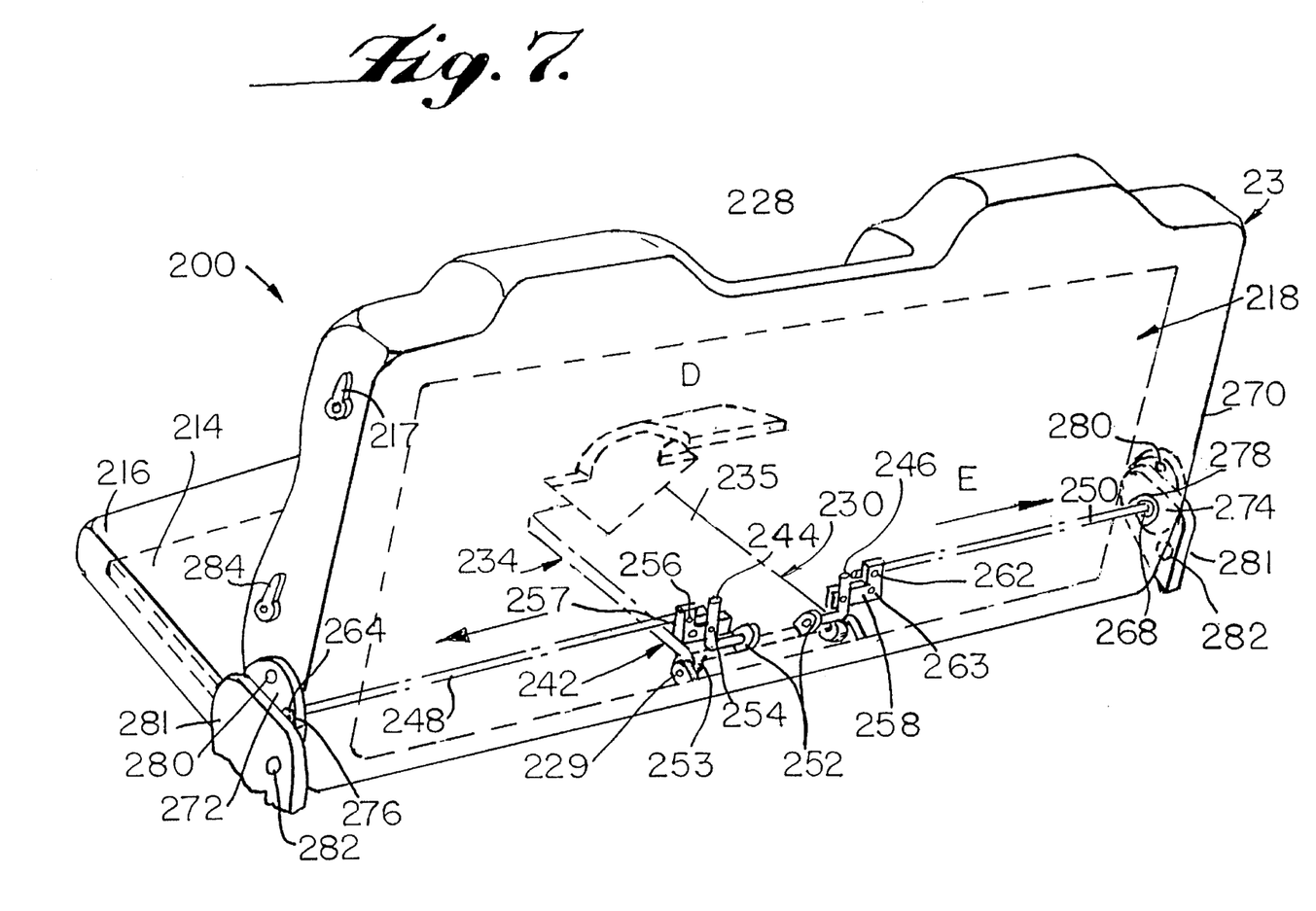
FIG. 7 is schematic, perspective view of an end portion of a full-folding vehicle seat including an integrated child seat module shown in an adult mode position, and including a locking mechanism shown in an unlocked position.
Figure 8:
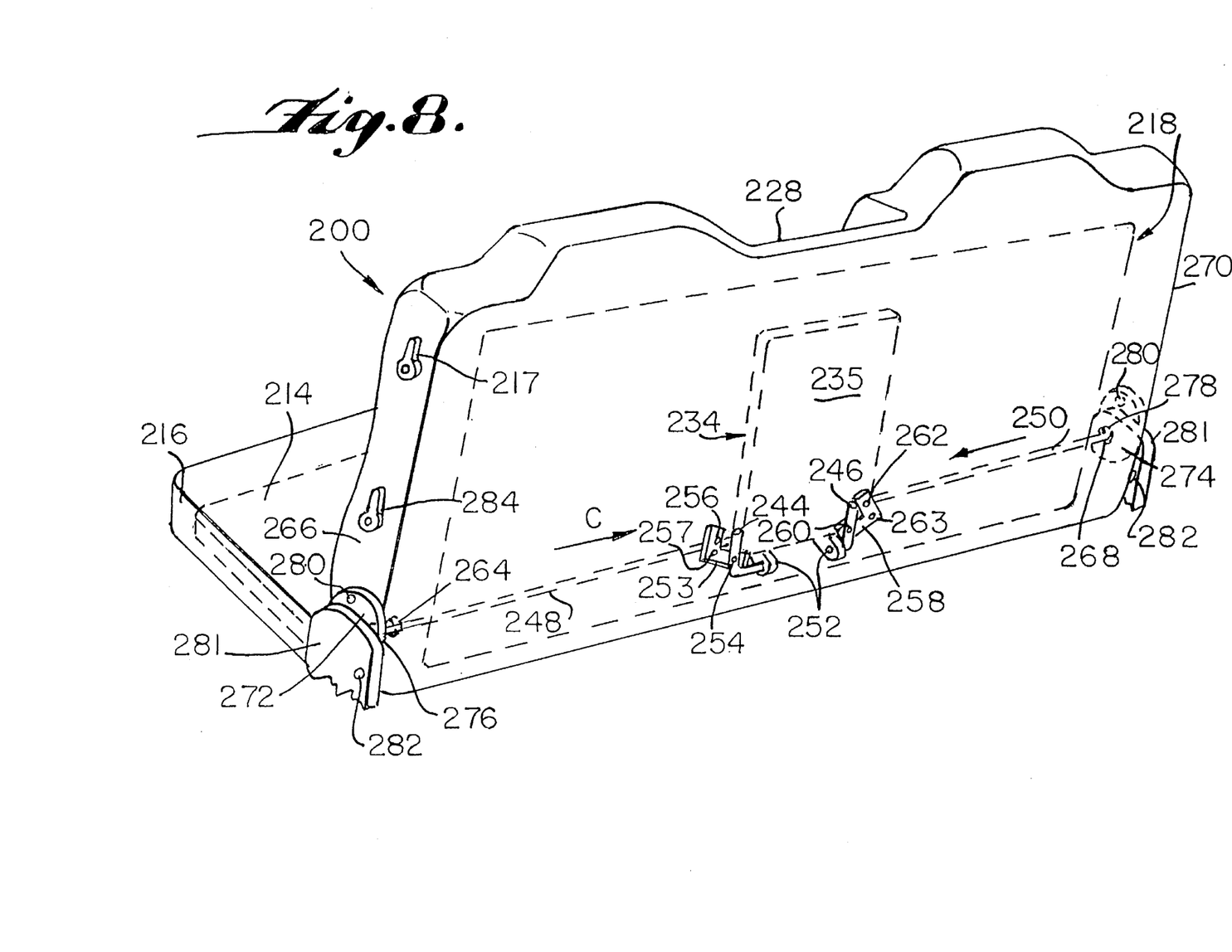
FIG. 8 is a schematic view similar to FIG. 7 showing the integrated child seat module in a child mode position and showing the locking mechanism in its locked position.

As shown in FIG. 8, horizontal rods 248 and 250 are constructed and arranged with the seat back frame assembly 218, so that rod 248 is movable from a retracted position (FIG. 8) to an extended position (FIG. 7) wherein end 264 of rod 248 extends beyond side cushion portion 266, and, in a similar manner, rod 250 is movable from a retracted position (FIG.8) to an extended position (FIG. 7) wherein end 268 of rod 250 extends beyond side cushion portion 270.

In the illustrated embodiment, seat cushion frame 214 includes a pair of rigid retaining members 272 and 274 disposed adjacent side cushion portions 266 and 270 respectively. Retaining member 272 includes a bore 276 and retaining member 274 includes a bore 278 therein, each bore being adapted to receive respective ends 264 and 268 of the horizontal rods 248 and 250.

In the vehicle seat 200 of FIGS. 7 and 8, the locking mechanism 242 may secure the seat back frame assembly 218 with respect to the seat cushion frame 214 by a latching operation in a horizontal direction.

The locking mechanism 242 operates as follows. When cushion assembly 234 is disposed within space 228 in the adult mode position, vertical rods 244 and 246 and horizontal rods 248 and 250 are disposed in a retracted non-locking position (FIG. 8). As shown in FIG. 8, the frame 235 is pivotably coupled to the seat back frame 218 at hinge 229. Hinge 229 is not shown in FIG. 5 for clarity of illustration. Thus, upon manual movement of the cushion assembly 234 towards the adult mode position, frame 234 pivots at hinge 229 which in turn causes brackets 253 and 258 to pivot with respect to the seat back frame assembly 218 at respective pins 257 and 263. The movement of brackets 253, 258 causes vertical rods 244 and 246 to move upwardly. The motion of the vertical rods 244 and 246 is transmitted generally simultaneously to the horizontal rods 248 and 250 respectively, via brackets 253 and 258, causing the horizontal rods 248 and 250 to move inwardly, in the direction of arrows C of FIG. 8. Thus, when the cushion assembly 34 is disposed in its adult mode position, the seat back frame assembly 218 is secured only by its conventional latching mechanism (not shown) and can be pivoted forwardly about pivots 280 to its inoperative, collapsed position after manual movement of the actuator 217 to unlatch the seat back frame assembly 218. It can be appreciated that the seat back frame assembly 218 may be mounted with respect to second pivots 282, which cooperate with the actuator 284 to permit the seat back frame assembly 218 to pivot rearwardly into selected reclining position. The latching mechanism, actuated by the actuator 217, is of any conventional construction which is capable of locking the seat back frame assembly 218 in its operative position whereby manual actuation thereof releases the seat back frame assembly from its locked position, permitting the seat back frame assembly to pivot forwardly to a fully-folded position wherein the seat back frame assembly rests upon the seat cushion frame 214. An example of a conventional actuating mechanism permitting a seat back to collapse forwardly and to recline in disclosed in U.S. Pat. No. 4,627,656, the disclosure of which is incorporated hereinto by this reference.

It is within the contemplation of the invention that the seat back frame assembly 218 be configured to only partially fold forwardly to a position having a horizontal component and thus, need not rest on the seat cushion frame 214.

When the cushion assembly 234 is moved from its adult mode position to its child mode position in the direction of arrow D in FIG. 7, vertical rods 244 and 246 are extended upwardly. The upward vertical motion of rods 244 and 246 is transmitted to outward horizontal movement of the horizontal rods 248 and 250 in the direction of arrows E in FIG. 7 via the brackets 253 and 258 so that the ends 264 and 268 of respective horizontal rods 248 and 250 engage bores 276 and 278 of respective retaining members 272 and 274. Thus, the seat back frame assembly 218 is locked, with respect to seat cushion frame 214 in its operative position, being prevented from moving towards its inoperative, collapsed position. However, since the seat back frame 218 is not locked with respect to plates 181, the seat back frame assembly 218 may be moved to a reclined position upon rearward pivoting about pivot 282.

It can be appreciated that if a split-folding seat back is provided with an integrated child seat, the locking mechanism 242 may be employed to lock the portion of the seat back, housing the child seat module in its operative position upon deployment of the movable cushion assembly of the child seat module to its child seat mode.

It has thus been shown that the vehicle seat including the locking mechanism provides a simple and effective means of securing the seat back frame assembly in its operative position upon deployment of movable cushion assembly to the child seat mode, thus, ensuring that the seat back frame assembly will not collapse upon a child disposed in the child seat.

It thus will be appreciated that the objects of this invention have been fully and effectively accomplished. It will be realized, however, that the foregoing preferred embodiments of the present invention have been shown and described for the purpose of illustrating the structural and functional principles of the present invention and is subject to change without departure from such principles. Therefore, this invention includes all the modifications encompassed within the spirit of the following claims.

What is claimed is:

1. A seat for a motor vehicle providing at least two modes of operation including an adult seat mode and a child seat mode, said seat comprising:

a rigid frame assembly constructed and arranged for securement within the motor vehicle having a seat cushion carried thereon, a rigid seat back frame assembly having a seat back cushion assembly carried thereon, said seat back frame assembly being mounted with respect to said rigid frame assembly for movement between an operative, generally vertical orientation defining a support position so as to support backs of vehicle occupants and a second inoperative orientation whereby said seat back frame assembly is disposed in a generally horizontal orientation in generally overlying relation with said seat cushion, said seat back cushion assembly including a movable cushion assembly mounted on said seat back frame assembly and being constructed and arranged to be movable, when said seat back frame assembly is in said operative position, between (1) an adult mode position wherein said movable cushion assembly provides an adult seat back for engaging the back of an adult sitting on said seat cushion and (2) a child mode position wherein said movable cushion assembly provides a child's seat disposed in overlying relation with said seat cushion, and a locking mechanism constructed and arranged with respect to said movable cushion assembly and said seat back frame assembly so as to be movable between (1) an unlocked position with respect to said rigid frame assembly when said movable cushion assembly is disposed in said adult mode position and (2) a locked position with respect to said rigid frame assembly in response to movement of movable cushion to said child mode position so as to prevent said seat back frame assembly from moving to its inoperative position.

2. The vehicle seat as defined in claim 1, wherein said seat back cushion assembly includes side cushions being spaced apart a distance to define a child receiving space therebetween of a size to enable a child to be disposed therebetween, said movable cushion assembly being disposed within said space between said side cushions when in said adult mode position.

3. The vehicle seat as defined in claim 2, wherein said movable cushion assembly includes a frame member connected to said seat back frame assembly for mounting said movable cushion assembly for movement between said adult mode and said child mode positions and a cushion carried by said frame member.

4. The vehicle seat as defined in claim 3, wherein said frame member is pivotally connected with said seat back frame assembly so that (1) in said adult mode position, said movable cushion is disposed within the space between said side cushions and (2) in said child mode position, said movable cushion assembly extends from a lower end portion of said space.

5. The vehicle seat as defined in claim 1, wherein said locking mechanism includes at least one rod member connected to said movable cushion assembly and being movable between (1) a first, latching position with respect to said rigid frame assembly in response to movement of said movable cushion to its child mode position preventing said seat back frame assembly from moving from its operative position towards its inoperative position and (2) a second, unlatching position with respect to said rigid frame assembly in response to movement of said movable cushion assembly from its child mode position to its adult mode position.

6. The vehicle seat as defined in claim 5, wherein said at least one rod member has first and second ends, said first end being coupled to said movable cushion assembly, said second end being constructed and arranged to be received by an interior portion of the vehicle when said at least one rod member is in said latching position.

7. The vehicle seat as defined in claim 6, wherein said at least one rod member is constructed and arranged with respect to said seat back frame assembly so as to extend between a lower portion of said seat back frame assembly and an upper portion thereof, said at least one rod member being mounted for generally vertical reciprocating movement with respect to said seat back frame assembly so as to engage with the interior portion of said vehicle when in said latching position and to disengage from the interior portion of the vehicle when in said unlatching position.

8. The vehicle seat as defined in claim 7, wherein two said rod members are provided in a spaced relation, each of said rod members having first and second ends, each of said first ends being coupled to said movable cushion assembly, each of said second ends being constructed and arranged to engage with the interior portion of the vehicle so as to maintain said seat back frame assembly in its locked position when said rod members are in said latching position.

9. A seat for a motor vehicle providing at least two modes of operation including an adult seat mode and a child seat mode, said seat comprising:

a rigid frame assembly constructed and arranged for securement within the motor vehicle having a seat cushion carried thereon, a rigid seat back frame assembly having a seat back cushion assembly carried thereon, said seat back frame assembly including a movable portion being mounted with respect to said rigid frame assembly for movement between an operative, generally vertical orientation defining a support position so as to support backs of vehicle occupants and a second inoperative orientation whereby said movable portion is disposed in a generally horizontal orientation in a generally overlying relation with said seat cushion, said seat back cushion assembly including a movable cushion assembly mounted on said movable portion of said seat back frame assembly and being constructed and arranged to be movable, when said movable portion of said seat back frame assembly is in said operative position, between (1) an adult mode position wherein said movable cushion assembly provides an adult seat back for engaging the back of an adult sitting on said seat cushion and (2) a child mode position wherein said movable cushion assembly provides a child's seat disposed in overlying relation with said seat cushion, and a locking mechanism constructed and arranged with respect to said movable cushion assembly and said movable portion of said seat back frame assembly so as to be movable between (1) an unlocked position with respect to said rigid frame assembly when said movable cushion assembly is disposed in said adult mode position and (2) a locked position with respect to said rigid frame assembly in response to movement of said movable cushion to said child mode position so as to prevent said movable portion of said seat back frame assembly from moving to its inoperative position.

10. The vehicle seat as defined in claim 9, wherein said seat back frame assembly includes a stationary portion and said locking mechanism includes at least one rod member connected to said movable cushion assembly and being movable between (1) a first, latching position engaging said stationary portion so as to prevent said movable portion of said seat back frame assembly from moving from its operative position towards its inoperative position with respect to said rigid frame assembly in response to movement of said movable cushion to its child mode position and (2) a second, unlatching position disengaging said stationary portion in response to movement of said movable cushion assembly from its child mode position to its adult mode position.

11. A seat for a motor vehicle providing at least two modes of operation including an adult seat mode and a child seat mode, said seat comprising:

a rigid frame assembly constructed and arranged for securement within the motor vehicle having a seat cushion carried thereon, a rigid seat back frame assembly having a seat back cushion assembly carried thereon, said seat back frame assembly including a movable portion being mounted with respect to said rigid frame assembly for movement between an operative, generally vertical orientation defining a support position so as to support backs of vehicle occupants and a second inoperative orientation whereby said movable portion is disposed with respect to said seat cushion in a position having a horizontal component, said seat back cushion assembly including a movable cushion assembly mounted on said movable portion of said seat back frame assembly and being constructed and arranged to be movable, when said movable portion of said seat back frame assembly is in said operative position, between (1) an adult mode position wherein said movable cushion assembly provides an adult seat back for engaging the back of an adult sitting on said seat cushion and (2) a child mode position wherein said movable cushion assembly provides a child's seat disposed in overlying relation with said seat cushion, and a locking mechanism constructed and arranged with respect to said movable cushion assembly and said movable portion of said seat back frame assembly so as to be movable between (1) an unlocked position with respect to said rigid frame assembly when said movable cushion assembly is disposed in said adult mode position and (2) a locked position with respect to said rigid frame assembly in response to movement of said movable cushion to said child mode position so as to prevent said movable portion of said seat back frame assembly from moving to its inoperative position.

* * * * *